(12) United States Patent
Winetraub et al.

(10) Patent No.: US 10,674,178 B2
(45) Date of Patent: Jun. 2, 2020

(54) ONE-DIMENSIONAL SEGMENTATION FOR COHERENT MOTION ESTIMATION

(71) Applicant: SAMSUNG ELECTRONICS CO., LTD., Suwon-si, Gyeonggi-do (KR)

(72) Inventors: Yonatan Winetraub, Ramat Gan (IL); Omri Govrin, Pardes Hana (IL)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 129 days.

(21) Appl. No.: 15/650,273

(22) Filed: Jul. 14, 2017

(65) Prior Publication Data
US 2018/0020231 A1 Jan. 18, 2018

Related U.S. Application Data
(60) Provisional application No. 62/362,778, filed on Jul. 15, 2016.

(51) Int. Cl.
H04N 19/56 (2014.01)
H04N 5/14 (2006.01)
H04N 19/103 (2014.01)
H04N 19/523 (2014.01)
H04N 19/433 (2014.01)
G06T 7/215 (2017.01)
G06T 7/223 (2017.01)

(52) U.S. Cl.
CPC .............. H04N 19/56 (2014.11); G06T 7/215 (2017.01); G06T 7/223 (2017.01); H04N 5/145 (2013.01); H04N 19/103 (2014.11); H04N 19/433 (2014.11); H04N 19/523 (2014.11); G06T 2207/20016 (2013.01); G06T 2207/20064 (2013.01)

(58) Field of Classification Search
CPC .... H04N 19/56; H04N 19/103; H04N 19/433; H04N 5/145; G06T 7/20
See application file for complete search history.

(56) References Cited

U.S. PATENT DOCUMENTS

| 6,157,677 A | * | 12/2000 | Martens | G06T 7/20 375/240.16 |
| 6,625,333 B1 | * | 9/2003 | Wang | G06T 3/4007 345/606 |
| 6,782,126 B2 | * | 8/2004 | Rao | G06K 9/342 382/164 |

(Continued)

Primary Examiner — Joseph Suh
(74) Attorney, Agent, or Firm — F. Chau & Associates, LLC

(57) ABSTRACT

A method for segmenting images for estimating motion includes scanning block rows of an image to determine whether image blocks that are adjacent within a row are similar, and grouping similar image blocks into a row segment. If a block in a row is not similar to a preceding adjacent block, the block is used to initialize a new row segment. The method further includes calculating data for each row segment in an image, and using this data to determine whether a motion vector field for a row segment is consistent, whether discontinuities exist in a row segment that can be corrected, or whether discontinuities exist in a row segment that cannot be corrected, and correcting those row segment discontinuities that can be fixed to remove artifacts from a set of motion vectors associated with said row segment.

18 Claims, 7 Drawing Sheets

(56) References Cited

U.S. PATENT DOCUMENTS

| | | | | |
|---|---|---|---|---|
| 8,724,697 B2* | 5/2014 | Lee | ............... | H04N 19/52 |
| | | | | 375/240.02 |
| 2008/0170787 A1* | 7/2008 | Cheng | ............... | G06T 7/11 |
| | | | | 382/180 |
| 2010/0013992 A1* | 1/2010 | Zhou | ............... | H04N 5/145 |
| | | | | 348/459 |
| 2010/0295980 A1* | 11/2010 | Chan | ............... | G06F 3/0428 |
| | | | | 348/308 |
| 2014/0126644 A1* | 5/2014 | Strom | ............... | H04N 19/52 |
| | | | | 375/240.16 |
| 2014/0126818 A1* | 5/2014 | Wei | ............... | G06T 7/215 |
| | | | | 382/171 |
| 2016/0352957 A1* | 12/2016 | Aikawa | ............... | H04N 1/053 |
| 2017/0308992 A1* | 10/2017 | Chalom | ............... | G06K 9/00281 |

* cited by examiner

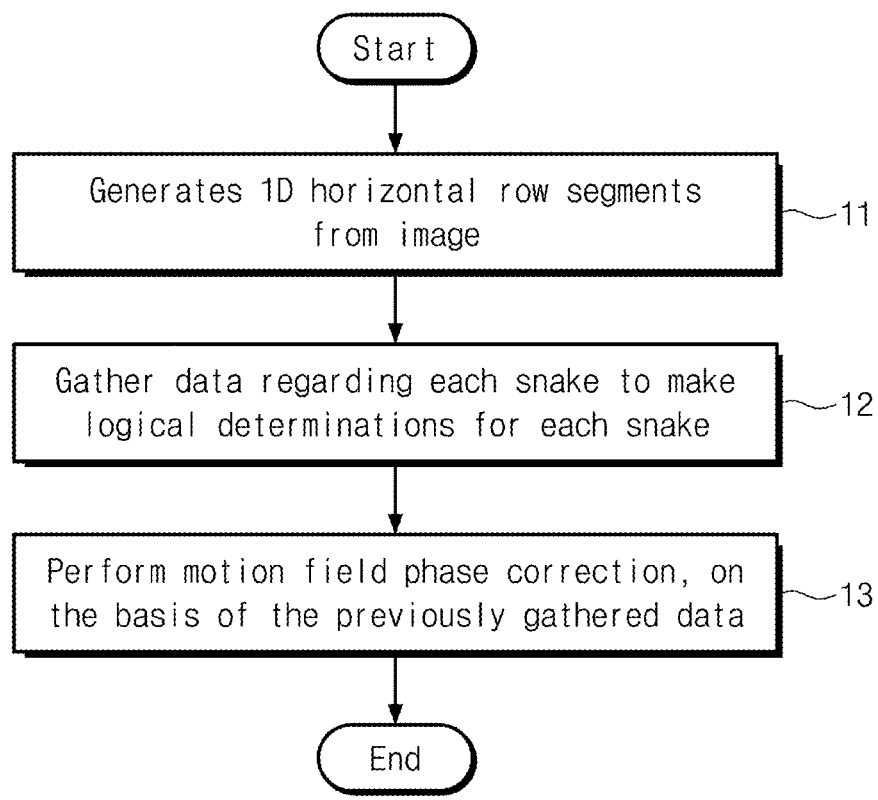
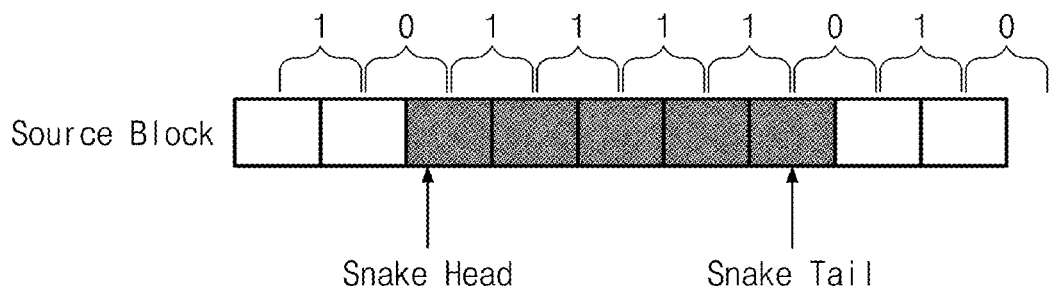

US 10,674,178 B2

ONE-DIMENSIONAL SEGMENTATION FOR COHERENT MOTION ESTIMATION

CROSS-REFERENCE TO RELATED APPLICATIONS

This application claims priority under 35 § 119 from U.S. Provisional Patent Application No. 62/362,778 filed on Jul. 15, 2016 the contents of which are herein incorporated by reference in their entirety.

BACKGROUND

1. Technical Field

Embodiments of the present disclosure are directed to an electronic system in which a sequence of images, such as a video clip is processed for motion estimation, in particular the creation of a motion field between each two consecutive images.

2. Discussion of the Related Art

Motion estimation (ME) algorithms are used for many image and video processing applications, including frame rate conversion and image enhancement. Block matching algorithms are common for fast/real-time ME, where a block is a connected group of one or more pixels. Block search is a common method for ME, which involves searching for a pair of blocks in consecutive images. Although block matching is effective in constructing a motion field, it often lacks a view of the "big-picture". Each block is matched individually, with possible constrains on motion field smoothness, without associating adjacent blocks to objects in the frame. Thus different blocks of the same object may be assigned with different motion.

A lack of a big picture view of block matching can contribute to the creation of several artifacts in the motion field. These include periodic pattern motion inconsistencies, known as the periodic pattern artifact; motion inconsistencies in different areas of the same object, referred to as object breakups; and motion field leakage from the object to the background, referred to as the halo artifact.

To correct for motion artifacts, post processing algorithms can be used. For example, a fast Fourier transform (FFT) with a motion collision detector can be used to fix periodic pattern artifacts, and motion thresholding combined with a blur filter can be used for object breakup. There are additional correction algorithms, such as scene labeling and image segmentation, however, it is challenging to implement these algorithms in a real-time environment.

SUMMARY

Embodiments of the present disclosure are directed to systems and methods for associating adjacent blocks and grouping them as pseudo objects in uniform motion units to minimize the above artifacts. According to embodiments, image segments that belong to the same object should have continuous, similar, motion vector (MV) values. Embodiments of the disclosure can identify discontinuities that result from motion estimation mistakes and correct them.

According to an embodiment of the disclosure, there is provided a computer-implemented method for segmenting images for estimating motion that includes scanning block rows of an image to determine whether image blocks that are adjacent within a row are similar, and grouping similar image blocks into a row segment, where an image block is a group of one or more connected pixels and has an associated motion vector and an associated smoothness value, where if a block in a row is not similar to a preceding adjacent block, the block is used to initialize a new row segment, calculating data for each row segment in an image, and using this data to determine whether a motion vector field for a row segment is consistent, whether discontinuities exist in a row segment that can be corrected, or whether discontinuities exist in a row segment that cannot be corrected, and correcting those row segment discontinuities that can be fixed, where correcting the row discontinuities removes artifacts from a set of motion vectors associated with the row segment.

According to a further embodiment of the disclosure, determining whether adjacent image row blocks are similar comprises comparing the adjacent image row blocks with a similarity metric, where the similarity metric is one selected from a group comprising a sum-of-absolute differences, a Haar measure, and integrating mean and smoothness attributes.

According to a further embodiment of the disclosure, calculating data for each row segment in an image include identifying the first block in each row segment and a last block in each row segment.

According to a further embodiment of the disclosure, calculating data for each row segment in an image includes calculating a cumulative motion vector for each row segment by initializing the cumulative motion vector for a row segment with the motion vector associated with the first block in the row segment, calculating a difference between the motion vector of each subsequent row segment block and the motion vector of its preceding row segment block, and adding the difference to the cumulative motion vector if the difference is less than a predetermined threshold, otherwise adding zero to the cumulative motion vector, and counting a number of motion field discontinuities for each row segment form a number of zeros added to the cumulative motion vector for each the row segment.

According to a further embodiment of the disclosure, calculating data for each row segment in an image includes clustering motion field vectors by initializing a first cluster with a first motion vector of a first row segment, determining a distance between a motion vector of each subsequent row segment block and a cluster center of each cluster, where a cluster center is a centroid of all motion vectors in the cluster, assigning the motion vector to a cluster if the distance between the motion vector and the cluster is less than a predetermined threshold, and updating the cluster center, otherwise initializing a new cluster with the motion vector.

According to a further embodiment of the disclosure, calculating data for each row segment in an image includes determining whether each row segment is smooth, where determining whether each row segment is smooth comprises counting a number of smooth blocks, where smooth block is defined by having its smoothness value be less than a predetermined threshold, counting a number of non-smooth blocks whose smoothness value is greater than the predetermined threshold, and determining that a row segment is smooth if the number of smooth blocks is greater than the number of non-smooth blocks.

According to a further embodiment of the disclosure, calculating data for each row segment in an image includes determining whether each row segment is smooth, where determining whether each row segment is smooth comprises calculating an average smoothness for each row segment, and determining that a row segment is smooth if the average smoothness is less than a predetermined threshold.

According to a further embodiment of the disclosure, a motion vector field for a row segment is determined to be consistent if there are no discontinuities in the motion vector field, otherwise the row segment is determined to be inconsistent, where determining whether to correct discontinuities in an inconsistent row segment comprises determining whether the row segment is not smooth, whether the motion vector of the first block of the row segment and of the last block of the row segment are on borders of the image, and whether the motion vector of the first block of the row segment and of the last block of the row segment are similar or whether the motion vector of the first block of the row segment and the cumulative motion vector of the row segment are similar, otherwise determining that the inconsistent row segment is not-fixable.

According to a further embodiment of the disclosure, correcting discontinuities in an inconsistent row segment comprises, starting from a second block immediately following the first block of the inconsistent row segment:

According to a further embodiment of the disclosure, calculating a difference between a current block motion vector and the block motion vector of a previous adjacent block of the row segment, comparing the difference to a threshold, and setting the difference to zero if the difference is greater than the threshold, and adding the difference to the current block motion vector.

According to a further embodiment of the disclosure, the method includes setting each motion vector of inconsistent row segment that is not-fixable to an invalid value.

According to another embodiment of the disclosure, there is provided a program storage device readable by a computer, tangibly embodying a program of instructions executable by the computer to perform the method steps for segmenting images for estimating motion.

BRIEF DESCRIPTION OF THE DRAWINGS

FIG. 1 is a flowchart of a snake segmentation algorithm according to an embodiment of the disclosure.

FIG. 2 illustrates a general scheme of a 1-D snake segmentation, according to an embodiment of the disclosure.

DETAILED DESCRIPTION OF EXEMPLARY EMBODIMENTS

Figure 3:
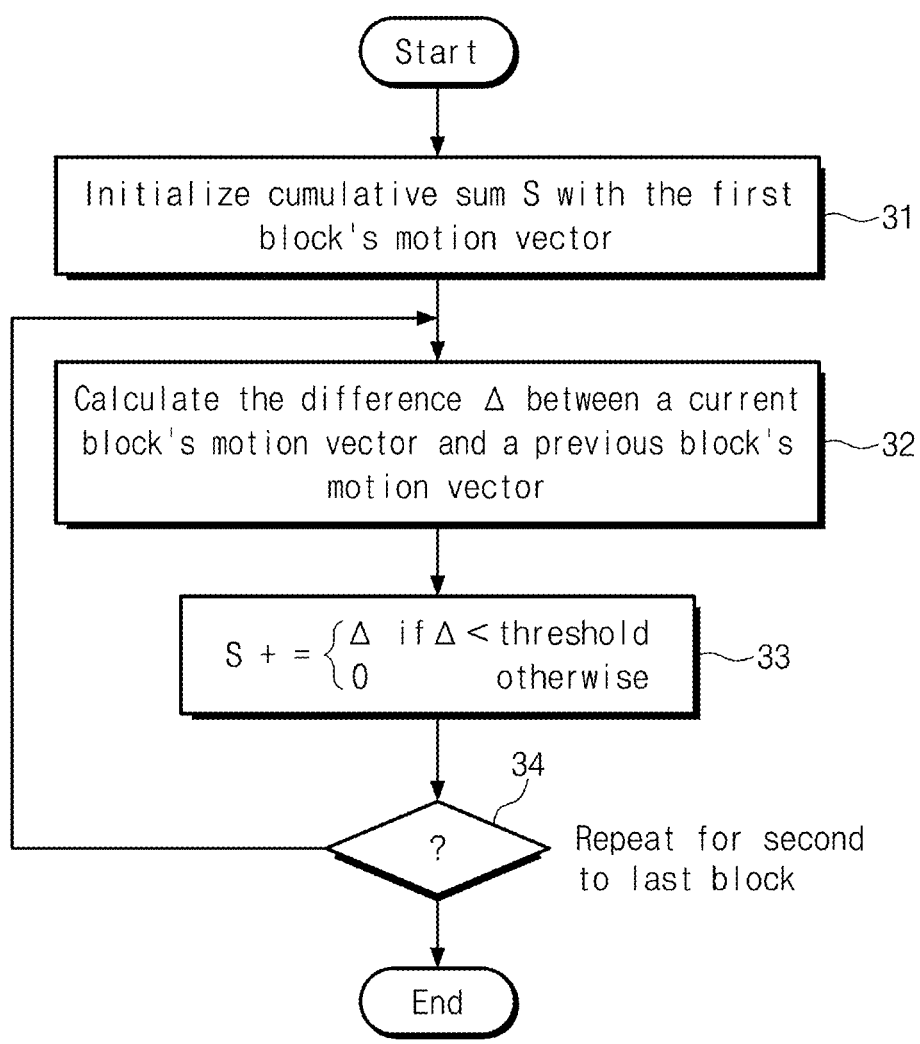
FIG. 3 is a flow chart of a method of calculating a cumulative motion vector from head to tail and verifying smoothness of the motion vector, according to an embodiment of the disclosure.

Exemplary embodiments of the disclosure as described herein generally provide systems and methods for implementing a method for one-dimensional segmentation for coherent motion estimation in digital images. While embodiments are susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

As used herein, the term "image" refers to multi-dimensional data composed of discrete image elements (e.g., pixels for 2-dimensional images and voxels for 3-dimensional images). The image may be, for example, an image of a subject collected by any imaging system known to one of skill in the art. Although an image can be thought of as a function from $R^3$ to R, methods of the disclosure are not limited to such images, and can be applied to images of any dimension, e.g., a 2-dimensional picture or a 3-dimensional volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

According to embodiments of the disclosure, it is assumed that segment edges are reliable in motion since they are close to edges, that segment edges are similar in motion, and that each discontinuity within a segment must be followed by another discontinuity that is similar in value but with an opposite sign.

A one-dimensional (1D) segmentation algorithm according to an embodiment of the disclosure, referred to herein below as a snake segmentation, is a simplified connected components algorithm that breaks image rows into row segments, referred to hereinbelow as snakes, and processes complete row segments, thus reducing artifacts in a ME process. A snake segmentation algorithm according to an embodiment can be easily integrated into a main motion estimation block with minimal cost, either hardware, in terms of chip count or clock time to generate a frame, or software related.

A snake segmentation algorithm according to an embodiment receives as input a set of images and an initial motion field that comprises an initial motion vector (MV) field per image block that may have originated from another source, such as a conventional motion estimator. A snake segmentation algorithm according to an embodiment corrects the initial motion field by locating errors, such as periodic patterns or object breakup artifacts, and correcting the errors.

A snake segmentation algorithm according to an embodiment may include three phases, as illustrated in the flowchart of FIG. 1, although the number of phases may vary in other embodiments of the disclosure. Referring now to FIG. 1, a first, pre-processing phase generates at step 11 1D horizontal row segments, referred to hereinbelow as snakes, using similarity metrics such as a sum of absolute differences (SAD), the first 8 Haar coefficients measure, integrating mean and smoothness attributes, etc. For example, if the Haar coefficients norm 1 distance between adjacent blocks is less than a threshold, the blocks may be considered similar, otherwise, the blocks may be determined to be discontinuous. A snake according to an embodiment is generated in a raster scan that scans through rows of image blocks and checks if each block is similar to its adjacent neighbor in the row. FIG. 2 depicts how a snake is identified in a row of source blocks. The numbers 0 or 1 above the source block indicate whether the bracketed pair of blocks associated with each number is similar, with 1 indicating similarity, and 0 indicating no-similarity. A block (y, x) that is similar to block (y, x+1) will be associated with the same snake segment, otherwise, block (y, x+1) will initialize a new segment. In this way, connected horizontal segment components can be formed.

Referring again to FIG. 1, in a second phase according to an embodiment, data is gathered regarding each snake as step 12 to make some logical determinations for each snake. For example, a snake head, i.e., the first block, and tail, i.e., a last block, are identified in a source block, as illustrated in FIG. 2.

According to an embodiment, a cumulative motion vector from head to tail can be calculated as follows, with reference to the flow chart of FIG. 3. First, at step 31, initialize a cumulative sum with the head block's motion vector. Then, at step 32, starting from the second block of the snake, calculate the difference between a current block's motion vector and the previous block's motion vector. At step 33, if the difference is less than a threshold, the difference is added to the cumulative sum, otherwise 0 is added, which eliminates large discontinuities or "jumps" from the cumulative sum. This implements a low pass filter for motion vectors. However, there are other implementations that can prevent high frequency velocity changes across the snake. Steps 32 and 33 are repeated from step 34.

According to embodiments, a number of motion field discontinuities in the snake can be identified through an above process by counting the number of zeros added to the cumulative sum.

Figure 4:
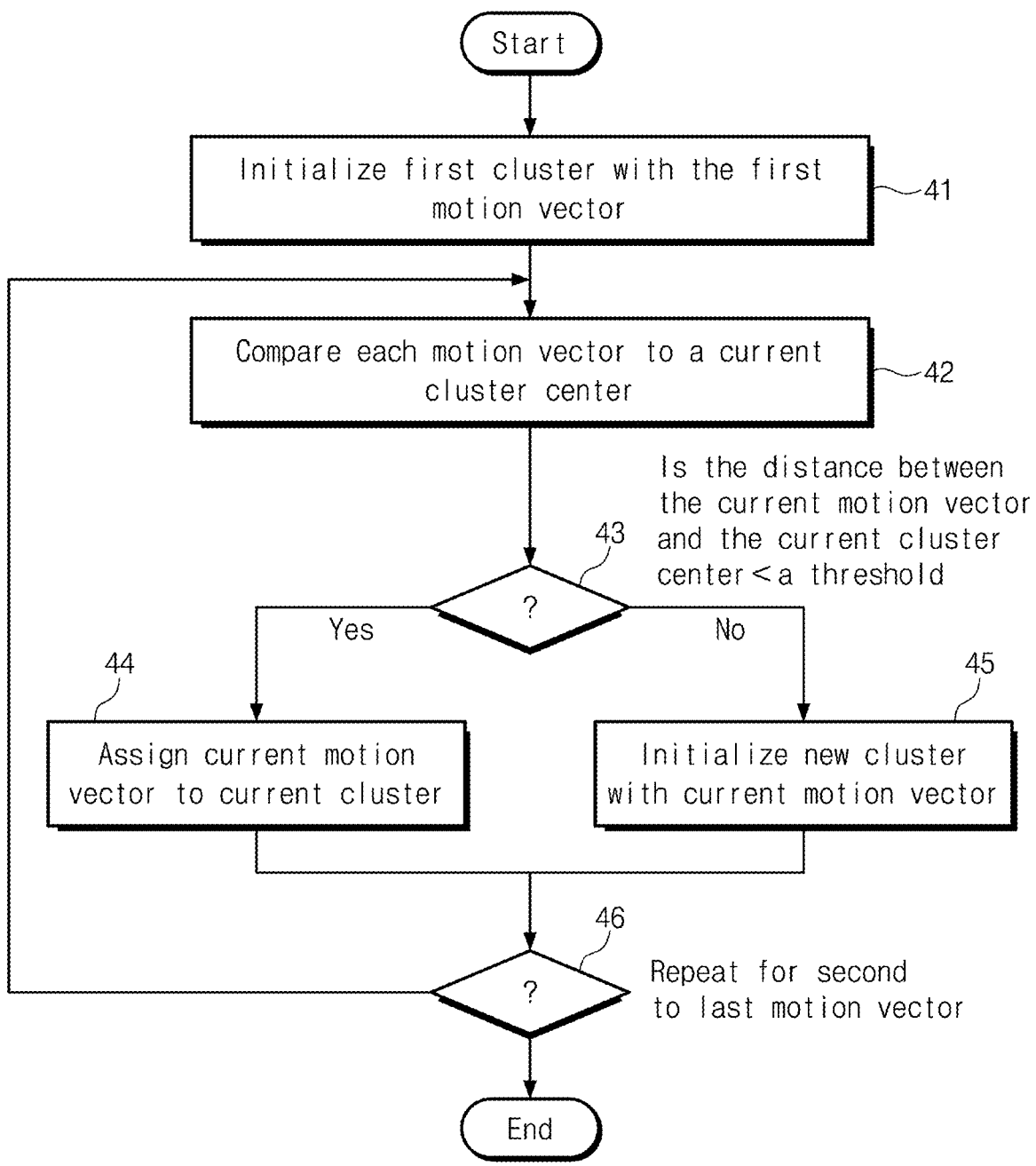
FIG. 4 is a flow chart of a method of clustering motion field vectors, according to an embodiment of the disclosure.

According to an embodiment, motion field vectors can be clustered, with reference to the flow chart of FIG. 4. A first cluster is initialized by the first motion vector, at step 41. Then, scanning the motion vectors one-by-one, each motion vector is compared to all the current clusters centers at step 42. An exemplary, non-limiting cluster center is defined as the centroid of the cluster. At step 43, if the distance between a motion vector and a cluster center is less than a threshold, then, at step 44 the motion vector is assigned to this cluster and the cluster center is updated. If no close clusters are found, then, at step 45, the motion vector initializes a new cluster. According to further embodiments, to reduce hardware requirements, cluster centers can be updated only for cluster sizes that are a power of 2. Steps 42-45 are repeated from step 46.

A snake can be considered to be smooth if most blocks in the snake are smooth and do not contain many edges, which is equivalent to the first Haar coefficient being dominant. For example, if the blocks in a sequence of blocks all have the same texture, they should also have the same or a substantially similar motion field. According to an embodiment, snake smoothness can be determined by counting the number of smooth blocks, i.e., blocks whose smoothness value is less than a threshold, the number of non-smooth blocks, i.e., blocks whose smoothness value is greater than the threshold, and determining the smoothness average. A snake can be considered to be smooth if the average is below a threshold, if the number of smooth blocks is greater than a threshold, or if the number if non-smooth blocks is below a threshold. Alternatively, if a block's motion derivative exceeds a threshold, then the block's motion field should be replaced.

According to embodiments, any other statistic that is relevant for the following decision logic can be calculated.

According to embodiments, on the basis of this information, logical decisions can be made as to whether or not to correct the snake, i.e., update the snake's motion vectors by replacing jumps with a MV similar to the majority of MV's in the snake. A decision algorithm according to an embodiment can output one of three results. (1) A snake is ok and should not be fixed. (2) A snake is not ok and should be fixed. (3) A snake not ok but for some reason should not be fixed. An example of a decision logic flow according to an embodiment is as follows.

If there are no discontinuities, the snake motion field is consistent, i.e., the snake is ok.

If discontinuities exist, the snake motion field is considered to be inconsistent and may or may not need fixing, based on the following considerations.

If the snake is not smooth, and both the head and tail motion vectors are similar or both the head motion vector and the cumulative motion vector are similar, and both the head and tail are not on image borders, then the snake can and should be fixed.

Otherwise, if the number of jumps or discontinuities is greater than one and the largest cluster is smaller than a threshold and the pyramid level in question is not level 1, then the snake is marked as a snake that is not ok but should not be fixed.

Figure 5:
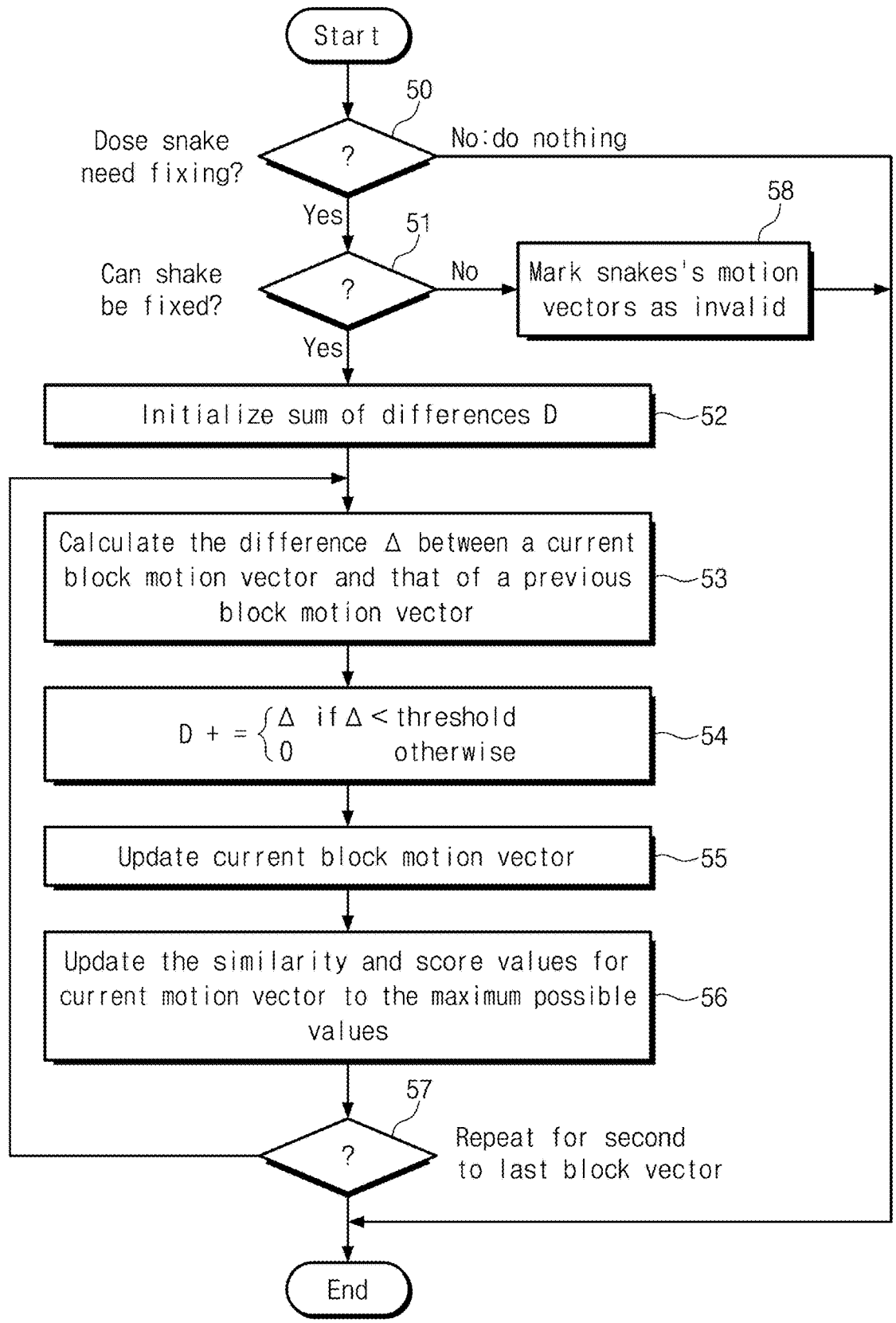
FIG. 5 is a flow chart of a method of performing motion field phase correction, according to an embodiment of the disclosure.

Referring again to FIG. 1, in a third phase according to an embodiment, motion field phase correction is performed at step 13. On the basis of the data gathered in previous phases, the motion field associated with the snake can be corrected to reduce artifacts. In general, a correction according to an embodiment will be in a direction that increases similarity between all MV's within the snake. An example of such correction method is as follows, with reference to the flow chart of FIG. 5.

Figure 6:
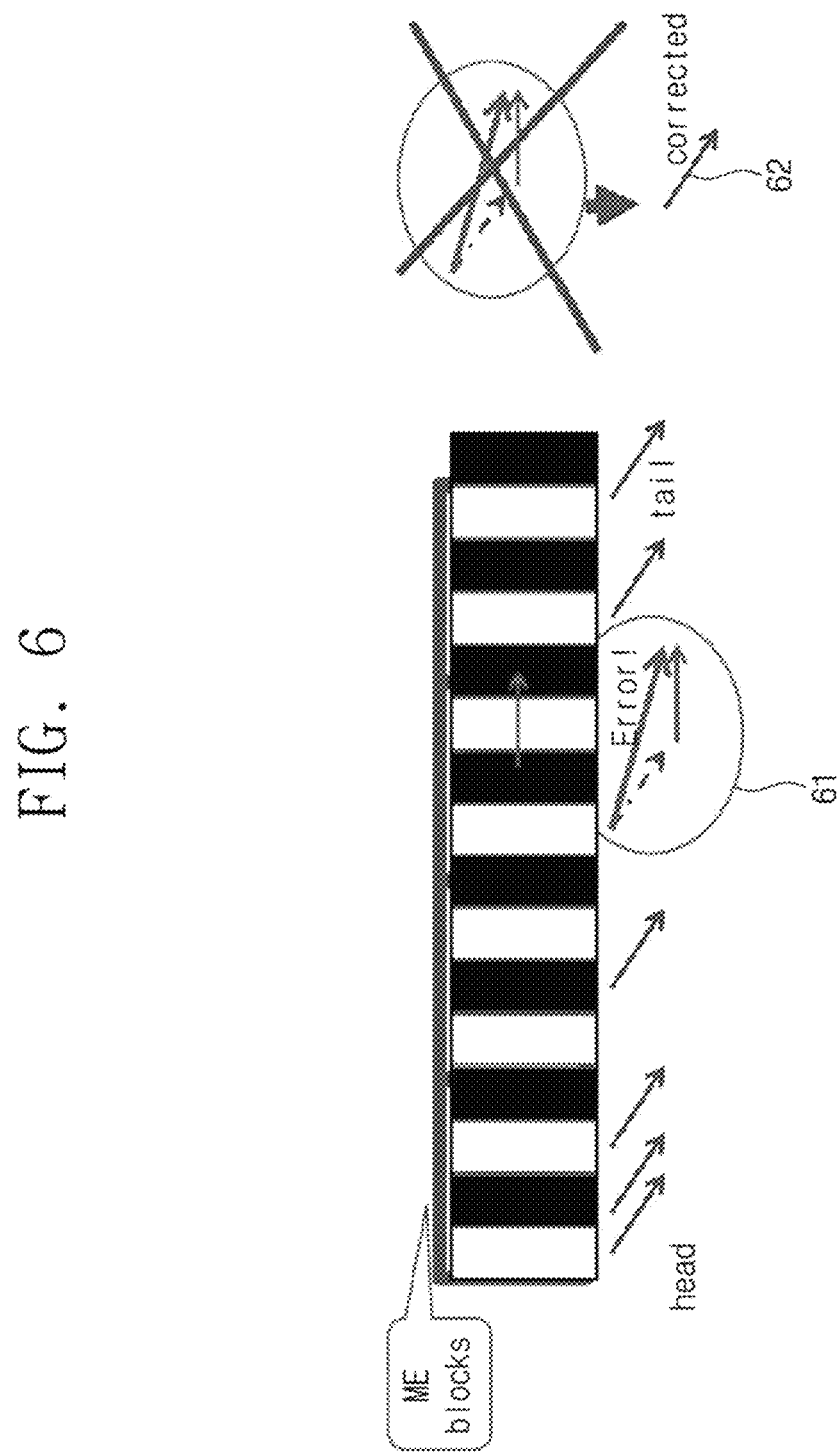
FIG. 6 illustrates motion field correction, according to an embodiment of the disclosure.

If, at step 50, if the snake is marked as being ok, no correction is performed, otherwise the snake is marked as a snake that should be fixed. At block 51, the snake is tested for being a snake that can be fixed. If the snake can be fixed, the block motion vectors are modified in a way similar to that which was used to create the cumulative motion vector from head to tail. A cumulative sum of differences is initialized to 0 at step 52. The motion vector of the first block is not modified. Starting from one end of the snake, the difference between a current block motion vector and that of a previously updated block motion vector is calculated, at step 53. At step 54, if the difference is less than a threshold, then the difference is added to the cumulative sum, otherwise at 0 is added to eliminate large discontinuities or jumps in the motion vectors. In either case, the current block motion vector is updated, at step 55, with either the difference or 0, as appropriate. The x and y components of the motion vector are updated separately. FIG. 6 illustrates motion estimation blocks ME blocks, including head and a tail, with a block motion vector 61 labeled "Error!" that needs to be fixed. The corrected vector 62 is shown to the right. Referring back to FIG. 5, at step 56, the similarity and score values are updated to be the maximum possible values, to indicate that these motion vectors were updated not due to similarity and score comparisons, but as part of a snakes algorithm according to an embodiment. Steps 52 to 56 are repeated from step 57.

If the snake is marked as a snake that is not ok but cannot be fixed, then, at step 58, all of its motion vectors are modified to be invalid. Each motion vector has a unique value which means "invalid". The similarity and score values are updated to be the maximum possible values to indicate that these motion vectors were not updated due to similarity and score comparisons but as part of a snakes algorithm according to an embodiment. An invalid tag on a motion vector may be used to indicate a low confidence motion vector that may be corrected with another method.

In a pyramid based motion estimation, a snake algorithm according to an embodiment can be executed for each pyramid level, and also for each field (backward/forward) separately. However, a snake algorithm according to an embodiment can be integrated into any type of motion estimation algorithm.

A snake segmentation according to an embodiment of the disclosure can be performed in real time and holistically integrated into a block matching scheme. However, a snake segmentation according to an embodiment can be incorporated into other motion estimation schemes where spatially connected image portions are matched. A snake segmentation according to an embodiment can provide a holistic view of objects inside a block matching scheme, helps preserve objects during ME, and requires no post processing, which reduces gate count and latency in a hardware implementation. Furthermore, a snake segmentation according to an embodiment uses a 1D segmentation, operating on the axis (x axis) by which most real world motions are oriented.

Figure 7:
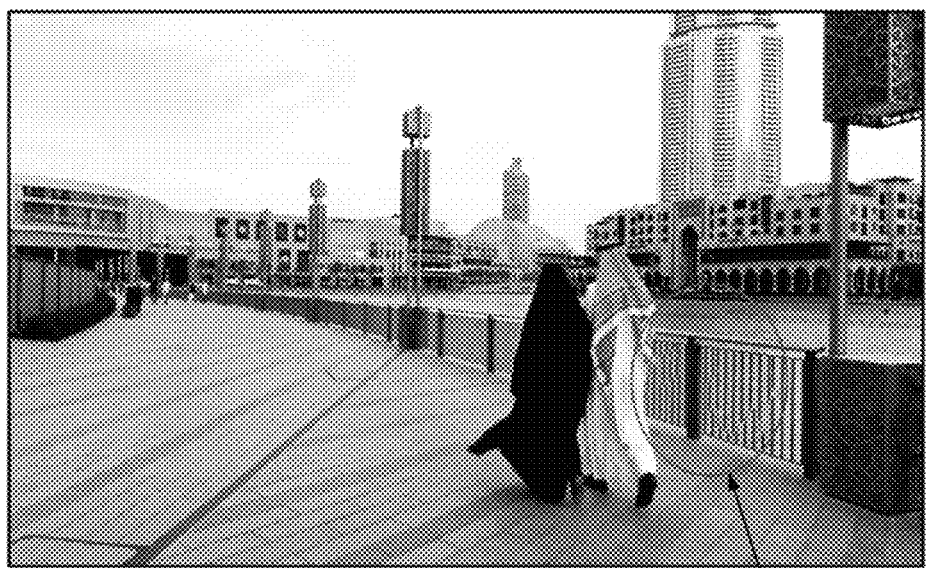
FIG. 7 is an image that was not motion corrected with a 1-D snake segmentation, according to an embodiment of the disclosure.
Figure 8:
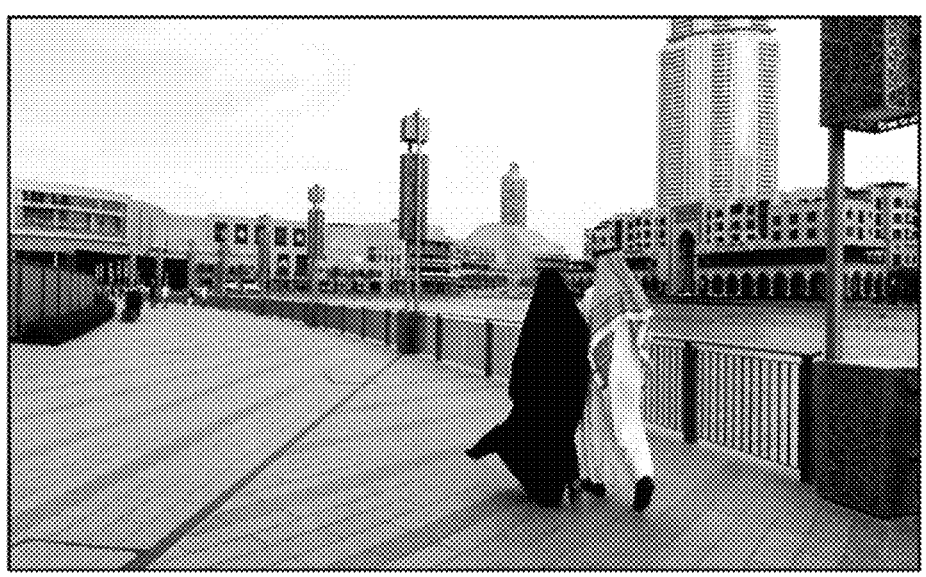
FIG. 8 is an image that was motion corrected with a 1-D snake segmentation, according to an embodiment of the disclosure.

FIG. 7 illustrates the correction of a motion field in a scenario with periodic patterns that does not use a snake algorithm according to an embodiment of the disclosure. The uncorrected periodic pattern is indicated by the circle 70. FIG. 8 illustrates the correction of a motion field in the same scenario that does use a snake algorithm according to an embodiment of the disclosure.

It is to be understood that embodiments of the present disclosure can be implemented in various forms of hardware, software, firmware, special purpose processes, or a combination thereof. In one embodiment, the present disclosure can be implemented in software as an application program tangible embodied on a computer readable program storage device. The application program can be uploaded to, and executed by, a machine comprising any suitable architecture.

Figure 9:
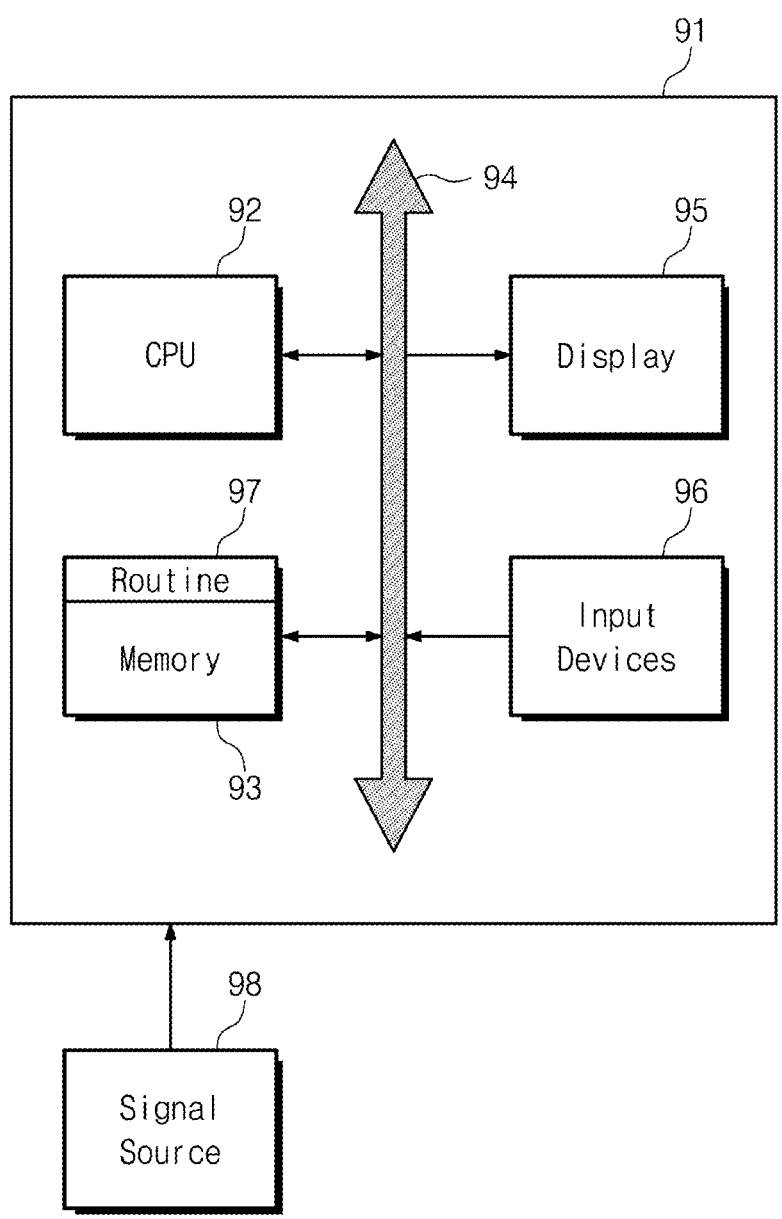
FIG. 9 is a block diagram of a system for implementing a method for one-dimensional segmentation for coherent motion estimation in digital images, according to an embodiment of the disclosure.

FIG. 9 is a block diagram of an exemplary computer system for implementing a method for detecting the existence of periodic patterns and aperture anomalies while performing motion estimation in digital images according to an embodiment of the disclosure. Referring now to FIG. 9, a computer system 91 for implementing the present disclosure can comprise, inter alia, a central processing unit (CPU) 92, a memory 93 and an input/output (I/O) interface 94. The computer system 91 is generally coupled through the I/O interface 94 to a display 95 and various input devices 96 such as a mouse and a keyboard. The support circuits can include circuits such as cache, power supplies, clock circuits, and a communication bus. The memory 93 can include random access memory (RAM), read only memory (ROM), disk drive, tape drive, etc., or a combinations thereof. The present disclosure can be implemented as a routine 97 that is stored in memory 93 and executed by the CPU 92 to process the signal from the signal source 98. As such, the computer system 91 is a general purpose computer system that becomes a specific purpose computer system when executing the routine 97 of the present disclosure.

The computer system 91 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present disclosure is programmed. Given the teachings of the present disclosure provided herein, one of ordinary skill in the related art will be able to contemplate these and similar implementations or configurations of the present disclosure.

While embodiments of the present disclosure has been described in detail with reference to exemplary embodiments, those skilled in the art will appreciate that various modifications and substitutions can be made thereto without departing from the spirit and scope of the disclosure as set forth in the appended claims.

What is claimed is:

1. A computer-implemented method for segmenting images for estimating motion, the method executed by a computer comprising the steps of:

scanning block rows of an image to determine whether image blocks that are adjacent within a row are similar, and grouping similar image blocks into a row segment, wherein an image block comprises a group of one or more connected pixels and has an associated motion vector and an associated smoothness value, wherein the smoothness is a measure of a variation of pixel values within the image block, wherein if a block in a row is not similar to a preceding adjacent block, said block is used to initialize a new row segment;

calculating data for each row segment in an image based on the motion vector and the smoothness value corresponding to each of the similar image blocks, and using this data to determine whether a motion vector field for a row segment is consistent, whether discontinuities exist in a row segment that can be corrected, or whether discontinuities exist in a row segment that cannot be corrected; and correcting those row segment discontinuities that can be fixed, wherein correcting said row discontinuities removes artifacts from a set of motion vectors associated with said row segment, wherein calculating data for each row segment in an image includes calculating a cumulative motion vector for each row segment by initializing said cumulative motion vector for a row segment with the motion vector associated with the first block in said row segment, calculating a difference between the motion vector of each subsequent row segment block and the motion vector of its preceding row segment block, and adding said difference to the cumulative motion vector if said difference is less than a predetermined threshold, otherwise adding zero to the cumulative motion vector, and counting a number of motion field discontinuities for each row segment from a number of zeros added to the cumulative motion vector for each said row segment.

2. The method of claim 1, wherein determining whether adjacent image row blocks are similar comprises comparing said adjacent image row blocks with a similarity metric, wherein adjacent image row blocks are similar if values of corresponding pixels in each image block are within a predetermined threshold of each other as measured by the similarity metric, wherein said similarity metric is one selected from a group comprising a sum-of-absolute differences, a Haar measure, and integrating mean and smoothness attributes.

3. The method of claim 1, wherein calculating data for each row segment in an image includes identifying the first block in each row segment and a last block in each row segment.

4. The method of claim 1, wherein calculating data for each row segment in an image includes clustering motion field vectors by
   initializing a first cluster with a first motion vector of a first row segment,
   determining a distance between a motion vector of each subsequent row segment block and a cluster center of each cluster, wherein a cluster center is a centroid of all motion vectors in said cluster,
   assigning said motion vector to a cluster if the distance between said motion vector and said cluster is less than a predetermined threshold, and updating said cluster center, otherwise initializing a new cluster with said motion vector.

5. The method of claim 1, wherein calculating data for each row segment in an image includes determining whether each row segment is smooth, wherein determining whether each row segment is smooth comprises counting a number of smooth blocks, wherein smooth block is defined by having its smoothness value be less than a predetermined threshold, counting a number of non-smooth blocks whose smoothness value is greater than said predetermined threshold, and determining that a row segment is smooth if the number of smooth blocks is greater than the number of non-smooth blocks.

6. The method of claim 1, wherein calculating data for each row segment in an image includes determining whether each row segment is smooth, wherein determining whether each row segment is smooth comprises calculating an average smoothness for each row segment, and determining that a row segment is smooth if the average smoothness is less than a predetermined threshold.

7. A computer-implemented method for segmenting images for estimating motion, the method executed by a computer comprising the steps of:
   scanning block rows of an image determine whether image blocks that are adjacent within a row are similar, and grouping similar image blocks into a row segment, wherein an image block comprises a group of one or more connected pixels and has an associated motion vector and an associated smoothness value, wherein the smoothness is a measure of a variation of pixel values within the image block, wherein if a block in a row is not similar to a preceding adjacent block, said block is used to initialize a new row segment;
   calculating data for each row segment in an image based on the motion vector and the smoothness value corresponding to each of the similar image blocks, and using this data to determine whether a motion vector field for a row segment is consistent, whether discontinuities exist in a row segment that can be corrected, or whether discontinuities exist in a row segment that cannot be corrected; and
   correcting those row segment discontinuities that can be fixed, wherein correcting said row discontinuities removes artifacts from a set of motion vectors associated with said row segment, wherein a motion vector field for a row segment is determined to be consistent if there are no discontinuities in the motion vector field, otherwise said row segment is determined to be inconsistent,
   wherein determining whether to correct discontinuities in an inconsistent row segment comprises determining whether the row segment is not smooth, whether the motion vector of the first block of said row segment and of the last block of said row segment are on borders of said image, and whether the motion vector of the first block of said row segment and of the last block of said row segment are similar or whether the motion vector of the first block of said row segment and the cumulative motion vector of said row segment are similar, otherwise determining that said inconsistent row segment is not-fixable.

8. The method of claim 7, wherein correcting discontinuities in an inconsistent row segment comprises, starting from a second block immediately following the first block of said inconsistent row segment:
   calculating a difference between a current block motion vector and the block motion vector of a previous adjacent block of said row segment;
   comparing the difference to a threshold, and setting said difference to zero if said difference is greater than said threshold; and
   adding said difference to said current block motion vector.

9. The method of claim 7, further comprising setting each motion vector of each inconsistent row segment that is not-fixable to an invalid value.

10. A program storage device readable by a computer, tangibly embodying a program of instructions executable by the computer to perform the method steps for segmenting images for estimating motion, the method executed by a computer comprising the steps of:
   scanning block rows of an image to determine whether image blocks that are adjacent within a row are similar, and grouping similar image blocks into a row segment, wherein an image block comprises a group of one or more connected pixels and has an associated motion vector and an associated smoothness value, wherein the smoothness is a measure of a variation of pixel values within the image block, wherein if a block in a row is not similar to a preceding adjacent block, said block is used to initialize a new row segment;
   calculating data for each row segment in an image based on the motion vector and the smoothness value corresponding to each of the similar image blocks, and using this data to determine whether a motion vector field for a row segment is consistent, whether discontinuities exist in a row segment that can be corrected, or whether discontinuities exist in a row segment that cannot be corrected; and
   correcting those row segment discontinuities that can be fixed, wherein correcting said row discontinuities removes artifacts from a set of motion vectors associated with said row segment,
   wherein calculating data for each row segment in an image includes clustering motion field vectors by
   initializing a first cluster with a first motion vector of a first row segment,
   determining a distance between a motion vector of each subsequent row segment block and a cluster center of each cluster, wherein a cluster center is a centroid of all motion vectors in said cluster,
   assigning said motion vector to a cluster if the distance between said motion vector and said cluster is less than a predetermined threshold, and updating said cluster center, otherwise initializing a new cluster with said motion vector.

11. The computer readable program storage device of claim 10, wherein determining whether adjacent image row blocks are similar comprises comparing said adjacent image row blocks with a similarity metric, wherein adjacent image row blocks are similar if values of corresponding pixels in each image block are within a predetermined threshold of each other as measured by the similarity metric, wherein said similarity metric is one selected from a group comprising a sum-of-absolute differences, a Haar measure, and integrating mean and smoothness attributes.

12. The computer readable program storage device of claim 10, wherein calculating data for each row segment in an image includes identifying the first block in each row segment and a last block in each row segment.

13. The computer readable program storage device of claim 12, wherein calculating data for each row segment in an image includes calculating a cumulative motion vector for each row segment by
   initializing said cumulative motion vector for a row segment with the motion vector associated with the first block in said row segment,
   calculating a difference between the motion vector of each subsequent row segment block and the motion vector of its preceding row segment block, and
   adding said difference to the cumulative motion vector if said difference is less than a predetermined threshold, otherwise adding zero to the cumulative motion vector, and
   counting a number of motion field discontinuities for each row segment from a number of zeros added to the cumulative motion vector for each said row segment.

14. The computer readable program storage device of claim 10, wherein calculating data for each row segment in an image includes determining whether each row segment is smooth, wherein determining whether each row segment is smooth comprises counting a number of smooth blocks, wherein smooth block is defined by having its smoothness value be less than a predetermined threshold, counting a number of non-smooth blocks whose smoothness value is greater than said predetermined threshold, and determining that a row segment is smooth if the number of smooth blocks is greater than the number of non-smooth blocks.

15. The computer readable program storage device of claim 10, wherein calculating data for each row segment in an image includes determining whether each row segment is smooth, wherein determining whether each row segment is smooth comprises calculating an average smoothness for each row segment, and determining that a row segment is smooth if the average smoothness is less than a predetermined threshold.

16. The computer readable program storage device of claim 10, wherein a motion vector field for a row segment is determined to be consistent if there are no discontinuities in the motion vector field, otherwise said row segment is determined to be inconsistent,
   wherein determining whether to correct discontinuities in an inconsistent row segment comprises determining whether the row segment is not smooth, whether the motion vector of the first block of said row segment and of the last block of said row segment are on borders of said image, and whether the motion vector of the first block of said row segment and of the last block of said row segment are similar or whether the motion vector of the first block of said row segment and the cumulative motion vector of said row segment are similar, otherwise determining that said inconsistent row segment is not-fixable.

17. The computer readable program storage device of claim 16, wherein correcting discontinuities in an inconsistent row segment comprises, starting from a second block immediately following the first block of said inconsistent row segment:
   calculating a difference between a current block motion vector and the block motion vector of a previous adjacent block of said row segment;
   comparing the difference to a threshold, and setting said difference to zero if said difference is greater than said threshold; and
   adding said difference to said current block motion vector.

18. The computer readable program storage device of claim 16, the method further comprising setting each motion vector of each inconsistent row segment that is not-fixable to an invalid value.

* * * * *